United States Patent
Hou et al.

(10) Patent No.: US 10,379,649 B1
(45) Date of Patent: Aug. 13, 2019

(54) TOUCH SCREEN, ELECTRONIC DEVICE, WIRELESS CHARGING METHOD AND WIRELESS CHARGING SYSTEM

(71) Applicant: FOCALTECH ELECTRONICS, LTD., Grand Cayman (KY)

(72) Inventors: Weijing Hou, Guangdong (CN); Jianwu Chen, Guangdong (CN); Xing Cao, Guangdong (CN); Hui Liu, Guangdong (CN); Guang Ouyang, Guangdong (CN)

(73) Assignee: FOCALTECH ELECTRONICS, LTD., Grand Cayman (KY)

( * ) Notice: Subject to any disclaimer, the term of this patent is extended or adjusted under 35 U.S.C. 154(b) by 0 days.

(21) Appl. No.: 16/024,874

(22) Filed: Jul. 1, 2018

(30) Foreign Application Priority Data

Feb. 8, 2018 (CN) .......................... 2018 1 0132121

(51) Int. Cl.
*G06F 3/041* (2006.01)
*H02J 7/02* (2016.01)

(52) U.S. Cl.
CPC .............. *G06F 3/041* (2013.01); *H02J 7/025* (2013.01)

(58) Field of Classification Search
None
See application file for complete search history.

(56) References Cited

U.S. PATENT DOCUMENTS

| 9,030,421 | B2 | 5/2015 | Tseng et al. | |
|---|---|---|---|---|
| 2015/0022194 | A1 | 1/2015 | Almalki et al. | |
| 2016/0087482 | A1* | 3/2016 | Wang | H02J 7/025 320/108 |
| 2017/0012461 | A1* | 1/2017 | Hayashi | H02J 7/025 |

FOREIGN PATENT DOCUMENTS

| CN | 103518175 A | 1/2014 |
|---|---|---|
| JP | 2004047701 A | 2/2004 |
| TW | 201737593 A | 10/2017 |
| WO | 2015020683 A1 | 2/2015 |
| WO | 2017171702 A1 | 10/2017 |

OTHER PUBLICATIONS

The Taiwanese First Office Action dated Jan. 7, 2019 along with the English Translation (privided by Google Translation).

* cited by examiner

*Primary Examiner* — Nicholas J Lee
(74) *Attorney, Agent, or Firm* — Yue (Robert) Xu; Apex Attorneys at Law, LLP

(57) ABSTRACT

A touch screen, an electronic device, a wireless charging method and a wireless charging system are provided, to overcome the defect in the conventional technology that an additional wireless charging device needs to be provided for an electronic device to wirelessly charging the electronic device. The touch screen is applied to the electronic device, and includes a touch sensor and a touch chip, where the touch sensor is electrically connected to the touch chip. In a case that the touch screen is used for wireless charging, the touch chip controls the touch sensor to form a receiving coil or a transmitting coil.

20 Claims, 15 Drawing Sheets

TOUCH SCREEN, ELECTRONIC DEVICE, WIRELESS CHARGING METHOD AND WIRELESS CHARGING SYSTEM

CROSS REFERENCE OF RELATED APPLICATION

This application claims the priority to Chinese Patent Application No. 201810132121.X, titled "TOUCH SCREEN, ELECTRONIC DEVICE, WIRELESS CHARGING METHOD AND WIRELESS CHARGING SYSTEM", filed on Feb. 8, 2018 with the State Intellectual Property Office of the People's Republic of China, which is incorporated herein by reference in its entirety.

FIELD

The present disclosure relates to the technical field of electronics, and particularly to a touch screen, an electronic device, a wireless charging method and a wireless charging system.

BACKGROUND

Wireless electric power transmission is replacing the conventional wired electric power transmission. Electronic devices can be charged without charging lines. For example, a mobile phone can be charged directly by using a wireless charging device without a charging line.

An additional wireless charging device needs to be provided for a conventional electronic device to wireless charging the conventional electronic device. For example, a dedicated shell corresponding to a wireless charger is additionally provided outside the mobile phone for performing wireless charging.

However, the additional wireless charging device increases the thickness of electronic devices and affects the appearance of the electronic device.

SUMMARY

A touch screen, an electronic device, a wireless charging method and a wireless charging system are provided according to the embodiments of the present disclosure, to overcome the defect in the conventional technology that an additional wireless charging device needs to be provided for an electronic device to wirelessly charging the electronic device.

In a first aspect of the present disclosure, a touch screen applied to an electronic device is provided, which includes a touch sensor and a touch chip, where the touch sensor is electrically connected to the touch chip.

The touch chip controls the touch sensor to form a receiving coil or a transmitting coil if the touch screen is used for wireless charging.

In a possible implementation, the touch chip controls the touch sensor to form a touch matrix if the touch screen is used for touch control.

In a possible implementation, the touch screen further includes a control switch. The control switch is arranged on the touch sensor or the touch chip, or arranged individually.

In a possible implementation, the touch chip controls the touch sensor to form the receiving coil or the transmitting coil via the control switch.

In a possible implementation, the touch chip controls the touch sensor to form the touch matrix via the control switch.

In a possible implementation, the control switch includes a first port and a second port.

The touch sensor forms the touch matrix if the first port is electrically connected to the touch sensor.

The touch sensor forms the receiving coil or the transmitting coil if the second port is electrically connected to the touch sensor.

In a possible implementation, the touch sensor is located in a target area of the touch screen. The target area includes an entire area or a part of the entire area of the touch screen.

In a possible implementation, the touch sensor includes first conducting electrodes and second conducting electrodes. The first conducting electrodes and the second conducting electrodes are arranged across each other at a predetermined angle, where the predetermined angle is an acute angle or a right angle.

In a possible implementation, the first conducting electrodes and the second conducting electrodes are arranged on the same surface of the same insulating material layer. The first conducting electrodes and the second conducting electrodes are arranged across each other at the predetermined angle on the same plane. The first conducting electrodes and the second conducting electrodes form capacitive nodes, the number of the first conducting electrodes is m, the number of the second conducting electrodes is n, and the first conducting electrodes and the second conducting electrodes form an array of m times n, where each of m and n is an integer greater than 1.

In a possible implementation, the first conducting electrodes and the second conducting electrodes are respectively arranged on top surfaces of two insulating material layers or bottom surfaces of two insulating material layers. The first conducting electrodes and the second conducting electrodes are arranged across each other at the predetermined angle on different planes. The first conducting electrodes and the second conducting electrodes form capacitive nodes, the number of the first conducting electrodes is m, the number of the second conducting electrodes is n, and the first conducting electrodes and the second conducting electrodes form an array of m times n, wherein each of m and n is an integer greater than 1.

In a possible implementation, the first conducting electrodes and the second conducting electrodes are respectively arranged on two surfaces of the same insulating material layer. The first conducting electrodes and the second conducting electrodes are arranged across each other at the predetermined angle on different planes. The first conducting electrodes and the second conducting electrodes form capacitive nodes, the number of the first conducting electrodes is m, the number of the second conducting electrodes is n, and the first conducting electrodes and the second conducting electrodes form an array of m times n, wherein each of m and n is an integer greater than 1.

In a second aspect of the present disclosure, a wireless charging method applied to an electronic device is provided. The electronic device includes the touch screen according to any one of the first aspect and the possible implementations of the first aspect. The wireless charging method includes: obtaining a wireless charging control instruction; controlling the touch screen to form the receiving coil in response to the wireless charging control instruction; and wirelessly charging the electronic device via coupled coils if the receiving coil is coupled to a transmitting coil.

In a possible implementation, the electronic device further includes a display screen, and after the controlling the touch screen to form the receiving coil in response to the wireless charging control instruction, the wireless charging method further includes: controlling the display screen to display a black screen.

In a possible implementation, the electronic device further includes a display screen, and after the controlling the touch screen to form the receiving coil in response to the wireless charging control instruction, the wireless charging method further includes: controlling the display screen to display a bright screen and disabling a touch function of the touch screen.

In a possible implementation, the wireless charging method further includes: placing the touch screen to face the transmitting coil.

In a third aspect of the present disclosure, a wireless charging method applied to an electronic device is provided. The electronic device includes the touch screen according to any one of the first aspect and the possible implementations of the first aspect. The wireless charging method includes: obtaining a wireless charging control instruction; controlling the touch screen to form the transmitting coil in response to the wireless charging control instruction; and wirelessly charging a target electronic device including a receiving coil via coupled coils if the transmitting coil is coupled to the receiving coil.

In a possible implementation, the electronic device further includes a display screen, and after the controlling the touch screen to form the transmitting coil in response to the wireless charging control instruction, the wireless charging method further comprises: controlling the display screen to display a black screen.

In a possible implementation, the electronic device further includes a display screen, and after the controlling the touch screen to form the transmitting coil in response to the wireless charging control instruction, the wireless charging method further includes: controlling the display screen to display a bright screen and disabling a touch function of the touch screen.

In a possible implementation, the wireless charging method further includes: placing the touch screen to face the receiving coil.

In a fourth aspect of the present disclosure, an electronic device applied to wireless charging is provided. The electronic device includes an input-output device, a memory and a processor.

The input-output device includes the touch screen according to any one of the first aspect and the possible implementations of the first aspect, and is configured to obtain the wireless charging control instruction.

The memory is configured to store computer executable program codes. The computer executable program codes include program instructions.

The processor is configured to execute the program instructions stored in the memory in response to the wireless charging control instruction. When the program instructions are executed, the touch screen is controlled to form the receiving coil.

In a possible implementation, the input-output device further includes a display screen. When the program instructions are executed, the display screen displays a black screen.

In a possible implementation, the input-output device further includes a display screen. When the program instructions are executed, the display screen displays a bright screen and a touch function of the touch screen is disabled.

In a possible implementation, the touch screen is placed to face the transmitting coil when the electronic device is wirelessly charged.

In a fifth aspect of the present disclosure, an electronic device applied to wireless charging is provided. The electronic device includes an input-output device, a memory and a processor.

The input-output device includes the touch screen according to any one of the first aspect and the possible implementations of the first aspect, and is configured to obtain the wireless charging control instruction;

The memory is configured to store computer executable program codes. The computer executable program codes include program instructions.

The processor is configured to execute the program instructions stored in the memory in response to the wireless charging control instruction. When the program instructions are executed, the touch screen is controlled to form the transmitting coil.

In a possible implementation, the input-output device further includes a display screen. When the program instructions are executed, the display screen displays a black screen.

In a possible implementation, the input-output device further includes a display screen. When the program instructions are executed, the display screen displays a bright screen and a touch function of the touch screen is disabled.

In a possible implementation, when the electronic device wirelessly charges a target device, the touch screen is placed to face a receiving coil of the target device.

In a sixth aspect of the present disclosure, a wireless charging system is provided. The wireless charging system includes a first electronic device and a second electronic device.

The first electronic device is the electronic device according to any one of the fourth aspect and the possible implementations of the fourth aspect. The first electronic device includes the receiving coil.

The second electronic device includes a transmitting coil. The transmitting coil is configured to be coupled to the receiving coil to wirelessly charge the first electronic device.

In a seventh aspect of the present disclosure, a wireless charging system is provided. The wireless charging system includes a first electronic device and a second electronic device.

The first electronic device is the electronic device according to any one of the fifth aspect and the possible implementations of the fifth aspect. The first electronic device includes the transmitting coil.

The second electronic device includes a receiving coil. The receiving coil is configured to be coupled to the transmitting coil to wirelessly charge the second electronic device.

In an eighth aspect of the present disclosure, a computer-readable storage medium is provided. The computer-readable storage medium is configured to store computer software instructions used by the electronic device according to any one of the fourth aspect and the possible implementations of the fourth aspect or the electronic device according to any one of the fifth aspect and the possible implementations of the fifth aspect. The computer software instructions include programs designed for executing the above aspects.

In a ninth aspect of the present disclosure, an electronic device is provided. The electronic device can realize the functions executed by the actual electronic devices performing the above methods. The functions can be realized by hardware, or by hardware executing corresponding software. The hardware or software includes one or more modules corresponding to the above functions.

It can be seen from the above technical solutions that the embodiments of the present disclosure have the following advantages.

The touch screen for wireless charging is applied to an electronic device. The touch screen includes the touch sensor and the touch chip. The touch sensor is electrically connected to the touch chip. If the touch screen is used for wireless charging, the touch chip controls the touch sensor to form the receiving coil or the transmitting coil. Therefore, wireless charging can be realized with the touch screen directly. Since the touch screen is applied to an electronic device, the electronic device can be wirelessly charged by using the touch screen directly without an additional wireless charging device. In this case, the appearance of the electronic device is not affected.

BRIEF DESCRIPTION OF THE DRAWINGS

For explaining technical solutions according to embodiments of the disclosure more clearly, drawings used in the illustration of the embodiments of the disclosure are described briefly. Apparently, the drawings in the following description are merely some of the embodiments of the disclosure, and other drawings may be obtained based on the drawings by those skilled in the art without any creative efforts.

DETAILED DESCRIPTION

Figure 1:
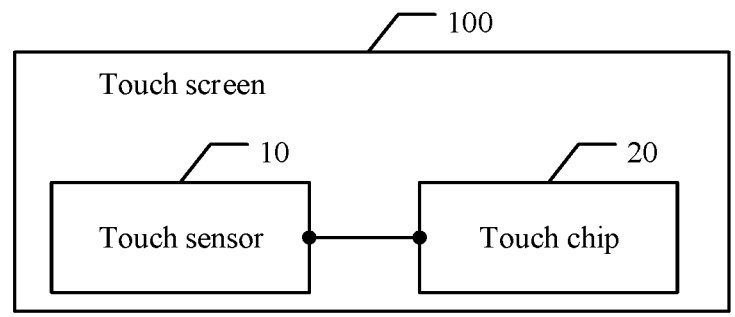
FIG. 1 is a schematic diagram of a touch screen according to an embodiment of the present disclosure.

A touch screen, an electronic device, a wireless charging method and a wireless charging system are provided according to the embodiments of the present disclosure, to overcome the defect in the conventional technology that an additional wireless charging device needs to be provided for an electronic device to wirelessly charging the electronic device.

The technical solution according to the embodiments of the present disclosure will be described clearly and completely as follows in conjunction with the drawings. It is apparent that the described embodiments are only a few rather than all of the embodiments according to the present disclosure. Any other embodiments obtained by those skilled in the art based on the embodiments in the present disclosure without any creative work fall in the scope of the present disclosure.

The terms 'first', 'second', 'third', 'fourth' and the like (if any) in the description and the claims, are used for distinguishing between similar parts and not necessarily for describing a particular sequential or chronological order. It should be understood that the data used in this way are interchangeable under appropriate circumstances and the embodiments of the disclosure described herein can be implemented in sequences other than those illustrated herein. Furthermore, terms "include", "comprise" or any other variations are intended to cover non-exclusive "include", so that a process, a method, a system, a product or a device including a series of steps or units not only include the steps or units, but also include other steps or units not explicitly listed, or also include inherent steps or units of the process, the method, the product or the device.

Smart phones, smart computers, smart wearable devices and other electronic devices are increasingly favored by users. For users, versatile and convenient electronic devices are expected. The use of a variety of functions poses a huge challenge to batteries of electronic devices. Under the current battery-limited technical background, convenient charging is the biggest demand of users at present. Currently, the wired charging is gradually replaced by the wireless charging, and electronic devices are no longer limited to the use of charging lines when charged. Therefore, the hassle of using charging lines is avoided.

However, an additional wireless charging devices needs to be provided for a conventional electronic device to wirelessly charging the conventional electronic device, which results in the increase of the thickness of electronic device, thus the appearance of the electronic device is affected. To overcome the defect, a touch screen, an electronic device, a wireless charging method and a wireless charging system are provided according to the present disclosure.

Before the introduction of the wireless charging of the electronic device, the wireless charging technology is explained first. The wireless charging technology utilizes near-field sensing to transmit energy from a wireless charger to an electronic device to be charged. The battery of the electronic device is charged by the received energy and provides energy for the operation of the electronic device. Since the wireless charger transmits energy to the electronic device by inductive coupling, no wire connection is required, and there is no conductive contact exposed. At present, there are three kinds of wireless charging modes, which includes electromagnetic induction charging, magnetic resonance charging and radio-wave charging. Take the electromagnetic induction charging as an example, the operating principle of the electromagnetic induction charging is that an alternating current of a certain frequency in a transmitting coil causes a current in the receiving coil by electromagnetic induction in an alternating current electromagnetic field, thus the energy can be transmitted from an output end to an receiving end to perform the wireless charging.

In the present disclosure, the wireless charging is performed by using a touch screen, which is applied to an electronic device. The electronic device includes but is not limit to a computer, a mobile phone, a tablet computer, a personal digital assistant (which is abbreviated as PDA) and an on-board computer. In this way, the electronic device can be wirelessly charged by using the touch screen directly without an additional wireless charging device. FIG. 1 is a schematic diagram of a touch screen 100 according to an embodiment. As illustrated in FIG. 1, the touch screen 100 includes a touch sensor 10 and a touch chip 20. The touch sensor 10 is electrically connected to the touch chip 20. If the touch screen 100 is used for wireless charging, the touch chip 20 controls the touch sensor 10 to form a receiving coil or a transmitting coil for performing wireless charging. That is, the formed receiving coil acts as a charged device for performing wireless charging when coupled to an external transmitting coil, or the formed transmitting coil acts as a charging device for performing wireless charging when coupled to an external receiving coil.

In a possible implementation, in addition to controlling the touch sensor 10 to form the receiving coil or the transmitting coil, the touch chip 20 further controls the touch sensor 10 to form a touch matrix if the touch screen 100 is used for touch control. In this way, the touch screen can not only realize touch function by forming the touch matrix, but also realize wireless charging by forming the receiving coil or the transmitting coil. That is, in practice, in addition to touch function, the touch screen can realize charging and power supply. The diversity in the function brings convenience to users. Of course, the touch sensor can be controlled by the touch chip 20 to switch from a touch control state to a wireless charging state, or to switch from the wireless charging state to the touch control state. As can be seen, the touch screen can be flexibly switched between the touch control state and the wireless charging state to meet the users' immediate needs effectively.

Figure 2A:
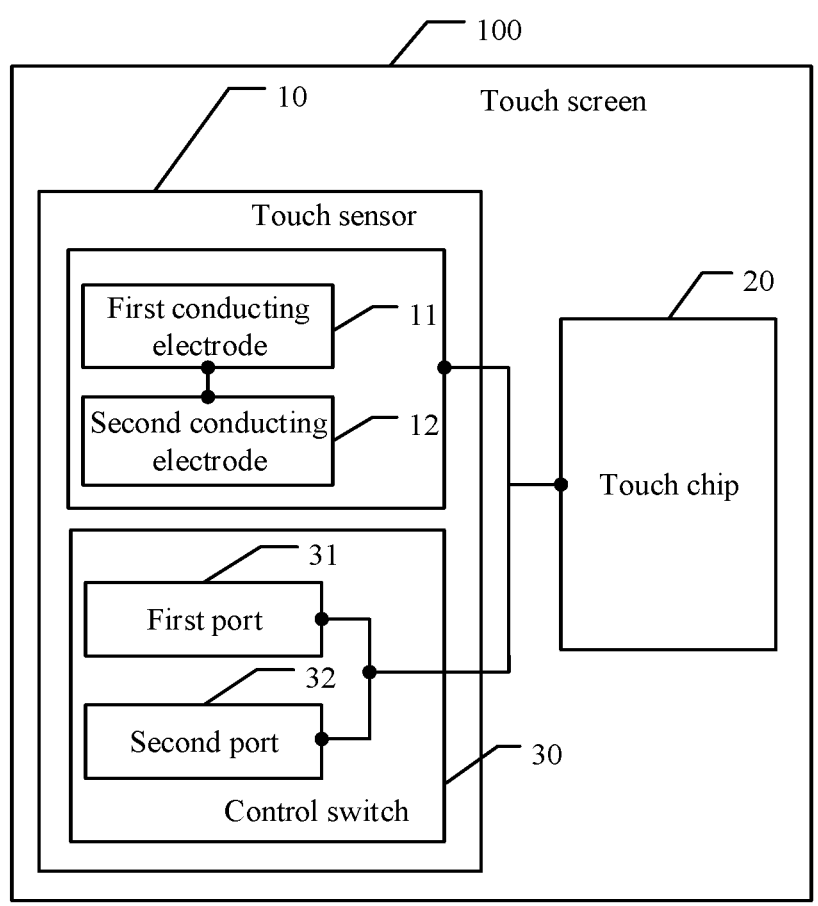
FIG. 2a is a schematic diagram of a touch screen according to another embodiment of the present disclosure.
Figure 2B:
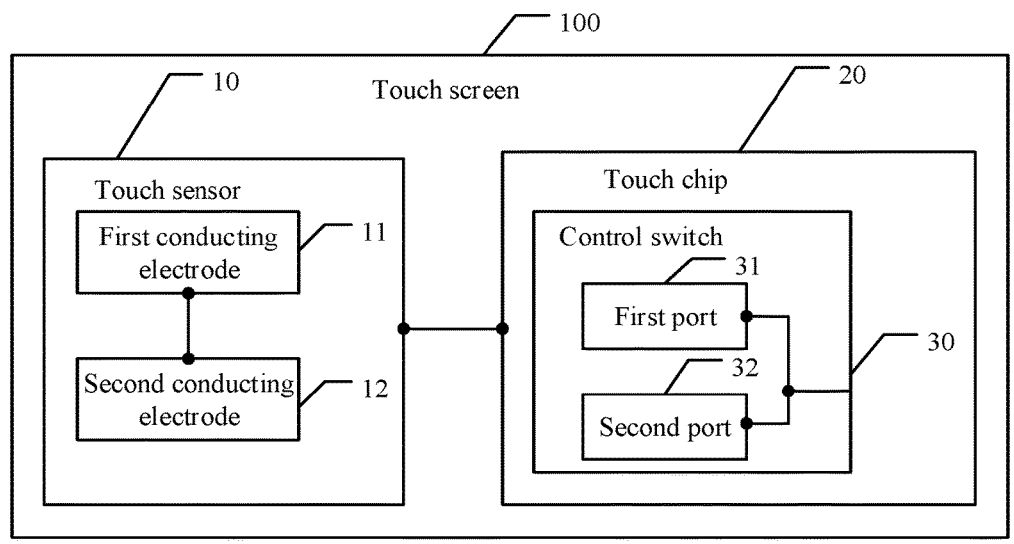
FIG. 2b is a schematic diagram of a touch screen according to another embodiment of the present disclosure.
Figure 2C:
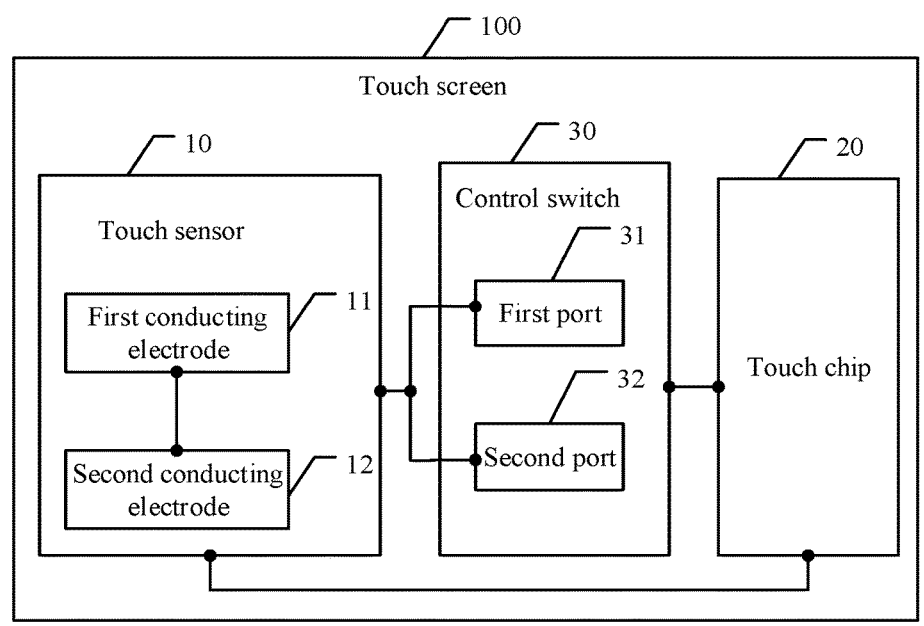
FIG. 2c is a schematic diagram of a touch screen according to another embodiment of the present disclosure.

On the basis of the touch screen illustrated in FIG. 1, the touch screen 100 further includes a control switch 30, as illustrated in FIGS. 2a, 2b and 2c. The control switch 30 illustrated in FIG. 2a is arranged on the touch sensor 10, which results in a short connecting line between the touch sensor 10 and the control switch 30 and a high integrated level of the touch sensor 10. The control switch 30 illustrated in FIG. 2b is arranged on the touch chip 20, which results in a short connecting line between the control switch 30 and the touch chip 20 and a high integrated level of the touch chip. The control switch 30 illustrated in FIG. 2c is arranged individually, i.e., the control switch may be individually arranged on a flexible printed circuit board of the touch screen. In this way, the control switch 30 can be arranged flexibly. In practice, the control switch 30 can be arranged on a chip other than the touch chip on the touch screen and connected to the touch chip through wires, which is not limited herein.

Continuing to refer to FIG. 2a to FIG. 2c, the control switch 30 includes a first port 31 and a second port 32. If the first port 31 is electrically connected to the touch sensor 10, the touch sensor 10 forms the touch matrix. If the second port 32 is electrically connected to the touch sensor 10, the touch sensor 10 forms the receiving coil or the transmitting coil. That is, when the first port is electrically connected to the touch sensor, the touch sensor is controlled to form the touch matrix, such that the touch screen operates in the touch control state. When the second port is electrically connected to the touch sensor, the touch sensor is controlled to form the receiving coil, such that the touch screen can act as a wireless charging receiving device for performing wireless charging in combination with a wireless charging transmitting device. Alternatively, when the second port is electrically connected to the touch sensor, the touch sensor is controlled to form the transmitting coil, such that the touch screen can act as a wireless charging transmitting device to wirelessly charge another electronic device. In practice, when the coil formed by the touch sensor is connected to a transmitting circuit, the transmitting coil is formed; and when the coil formed by the touch sensor is connected to a receiving circuit, the receiving coil is formed.

In a possible implementation, the touch sensor 10 is located in a target area of the touch screen 100. The target area includes an entire area of the touch screen 100 or a part of the entire area of the touch screen 100, such as a middle area, an upper-half area, a lower-half area, a left-half area, a right-half area or the entire screen. Take the smart phone as an example, where the touch sensor is located on the entire touch screen. Of course, the touch sensor can be arranged manually by the user or automatically by the electronic device. For example, the touch sensor can be arranged by the user at a designated location of the touch screen based on an actual demand, which is not limited herein.

Continuing to refer to FIG. 2a to FIG. 2c, the touch sensor 10 includes first conducting electrodes 11 and second conducting electrodes 12, the first conducting electrodes 11 and the second conducting electrodes 12 are arranged across each other at a predetermined angle, where the predetermined angle is an acute angle or a right angle, which is not limited herein. The arrangement of the first conducting electrodes and the second conducting electrodes includes but is not limited to any one of the following.

In a possible implementation, the first conducting electrodes and the second conducting electrodes are arranged on the same surface of the same insulating material layer. The first conducting electrodes and the second conducting electrodes are arranged across each other at the predetermined angle on the same plane. The first conducting electrodes and the second conducting electrodes form capacitive nodes. The number of the first conducting electrodes is m, the number of the second conducting electrodes is n, and the first conducting electrodes and the second conducting electrodes form an array of m times n, where each of m and n is an integer greater than 1.

In a possible implementation, the first conducting electrodes and the second conducting electrodes are respectively arranged on top surfaces of two insulating material layers or bottom surfaces of two insulating material layers. The first conducting electrodes and the second conducting electrodes are arranged across each other at the predetermined angle on different planes. The first conducting electrodes and the second conducting electrodes form capacitive nodes. The number of the first conducting electrodes is m, the number of the second conducting electrodes is n, and the first conducting electrodes and the second conducting electrodes form an array of m times n, where each of m and n is an integer greater than 1.

In a possible implementation, the first conducting electrodes and the second conducting electrodes are respectively arranged on two surfaces of the same insulating material layer. The first conducting electrodes and the second conducting electrodes are arranged across each other at the predetermined angle on different planes. The first conducting electrodes and the second conducting electrodes form capacitive nodes. The number of the first conducting electrodes is m, the number of the second conducting electrodes is n, and the first conducting electrodes and the second conducting electrodes form an array of m times n, where each of m and n is an integer greater than 1.

The insulating material includes at least one of resin and inorganic glass. Of course, the insulating material can also be an insulating material other than resin and inorganic glass, such as polyterephthalate, polymethyl methacrylate, polycarbonate, polyurethane and polystyrene, which is not limited herein.

In practice, the first conducting electrodes 11 and the second conducting electrodes 12 may be made of a conducting material of transparent indium tin oxide (which is abbreviated as ITO). Of course, the first conducting electrodes 11 and the second conducting electrode 12 may be made of other materials, such as graphene, METAL-MESH, which is not limited herein. Each of the first conducting electrodes 11 and the second conducting electrodes 12 may include at least one conducting electrode. The first conducting electrodes 11 may be arranged at regular intervals, and the second conducting electrodes 12 may be arranged at regular intervals. Of course, the first conducting electrodes 11 and the second conducting electrodes 12 may be arranged in other manners, which is not limited herein. For example, on the same insulating material layer, there are m (m>1) rows of the first conducting electrodes 11 in the transverse direction and n (n>1) columns of the second conducting electrodes 12 in the longitudinal direction, to form an array of m times n. The first conducting electrodes and the second conducting electrodes are arranged on the same surface or two surfaces of the same insulating material layer, and form capacitive nodes. As another example, there are m (m>1) rows of the first conducting electrodes 11 arranged in the transverse direction on the bottom surface of the two-layer insulating material and n (n>1) columns of the second conducting electrodes 12 arranged in the longitudinal direction on a higher surface of the two-layer insulating material. That is, m (m>1) rows of conducting electrodes and n (n>1) columns of conducting electrodes form an array of m times n. The first conducting electrodes and the second conducting electrodes form capacitive nodes. The shape of each of the first conducting electrodes and the second conducting electrodes may be triangle, rectangular, round, elliptic, or other shapes, which is not limited herein. The sizes of each of the first conducting electrodes 11 and the second conducting electrodes 12 may be set depend on actual demands, which is not limited herein.

In practice, if the touch screen is used for wireless charging, the m (m>1) rows of the first conducting electrodes 11 or the n (n>1) columns of the second conducting electrodes 12 on the entire touch screen or a part of the entire touch screen are connected end-to-end through the control switch under control of the touch chip to form an S-shaped coil in an X or Y direction, thereby forming a receiving antenna or a transmitting antenna. The S-shaped coil in the X or Y direction can be used as a receiving antenna or a transmitting antenna of the wireless charging device. Of course, the receiving coil or the transmitting coil may have a shape other than the S shape, which is not limited herein.

In practice, when the touch screen is used for touch control, the first conducting electrodes and the second conducting electrodes are connected into a touch control configuration by the touch chip. The touch chip extracts touching information and reports coordinate information corresponding to the touching information to a system. When the touch screen is used for wireless charging, the first conducting electrodes and/or the second conducting electrodes are connected into a configuration of a wireless charging receiving coil or transmitting coil by the touch chip, i.e., the wireless charging receiving coil or transmitting coil can be formed by the first conducting electrodes or the second conducting electrodes, or a bigger wireless charging receiving coil or transmitting coil can be formed by the first conducting electrodes and the second conducting electrodes, then the touch chip connects the wireless charging receiving coil or transmitting coil into the system and monitors the wireless charging state of the touch screen in a real time manner.

Figure 3:
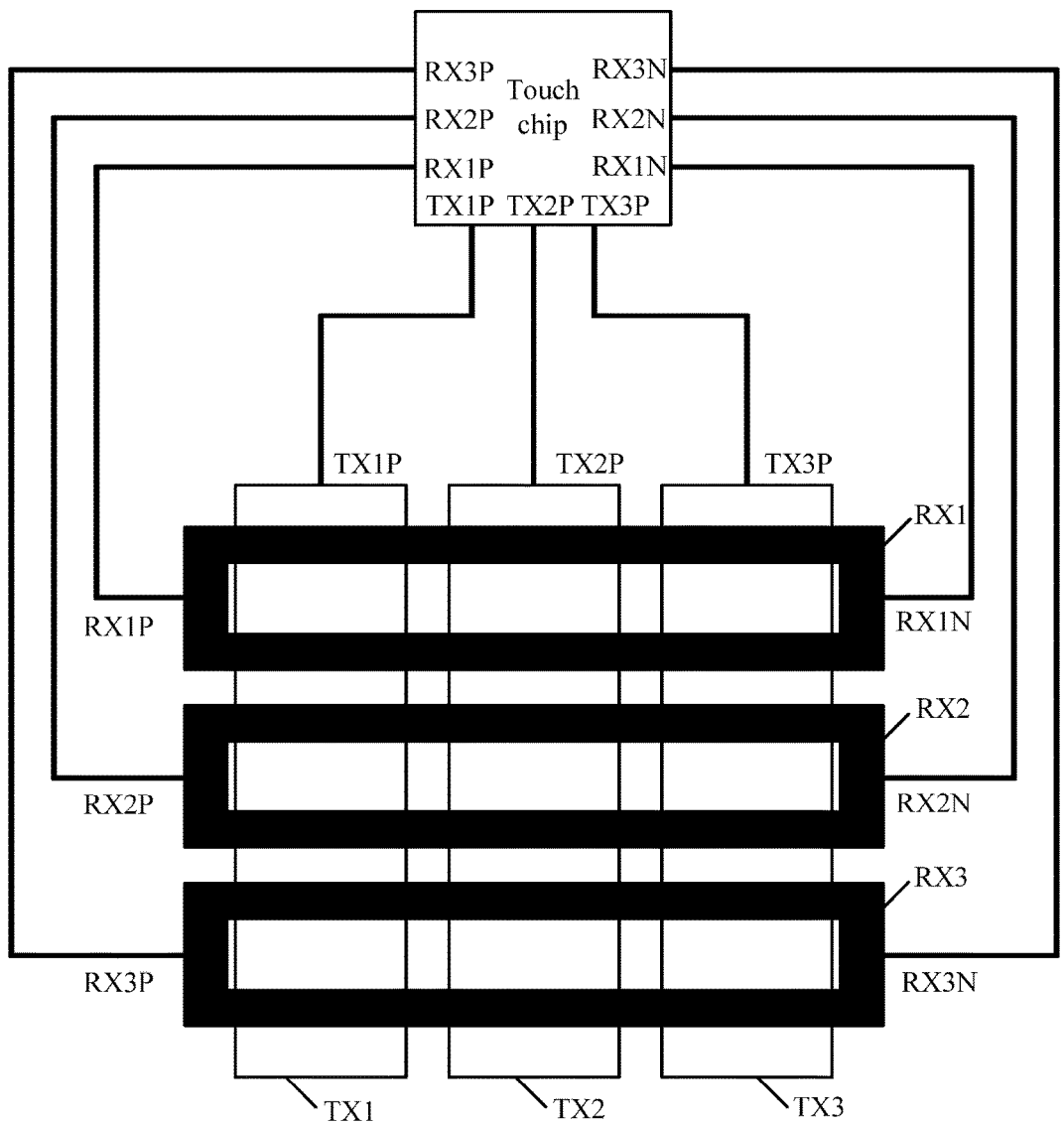
FIG. 3 is a schematic diagram illustrating connection between the touch sensor and the touch chip according to an embodiment of the present disclosure.

In practice, the first conducting electrodes may be sensing (RX) electrodes, the second conducting electrodes may be driving (TX) electrodes. Reference is made to FIG. 3, which is a schematic diagram illustrating connection between the touch sensor and the touch chip. A case where three RX electrodes and three TX electrodes are provided is taken as an example. The control switch is arranged on the touch sensor, three pins RX1N, RX2N and RX3N are respectively arranged on the right ends of the three RX electrodes, and three pins RX1P, RX2P and RX3P are respectively arranged on the left ends of the three RX electrodes. A conductive wire RX1P extended from the left end of the electrode RX1 is connected to a RX1P terminal of the touch chip, and a conductive wire RX1N extended from the right end of the electrode RX1 is connected to a RX1N terminal of the touch chip. A conductive wire RX2P extended from the left end of the electrode RX2 is connected to a RX2P terminal of the touch chip, and a conductive wire RX2N extended from the right end of the electrode RX2 is connected to a RX2N terminal of the touch chip. A conductive wire RX3P extended from the left end of the electrode RX3 is connected to a RX3P terminal of the touch chip, and a conductive wire RX3N extended from the right end of the electrode RX3 is connected to a RX3N terminal of the touch chip. Three pins TX1P, TX2P, TX3P are respectively arranged on the upper ends of the three TX electrodes, where a conductive wire TX1P of the electrode TX1 is connected to a TX1P terminal of the touch chip, a conductive wire TX2P of the electrode TX2 is connected to a TX2P terminal of the touch chip, and a conductive wire TX3P of the electrode TX3 is connected to a TX3P terminal of the touch chip.

Figure 4:
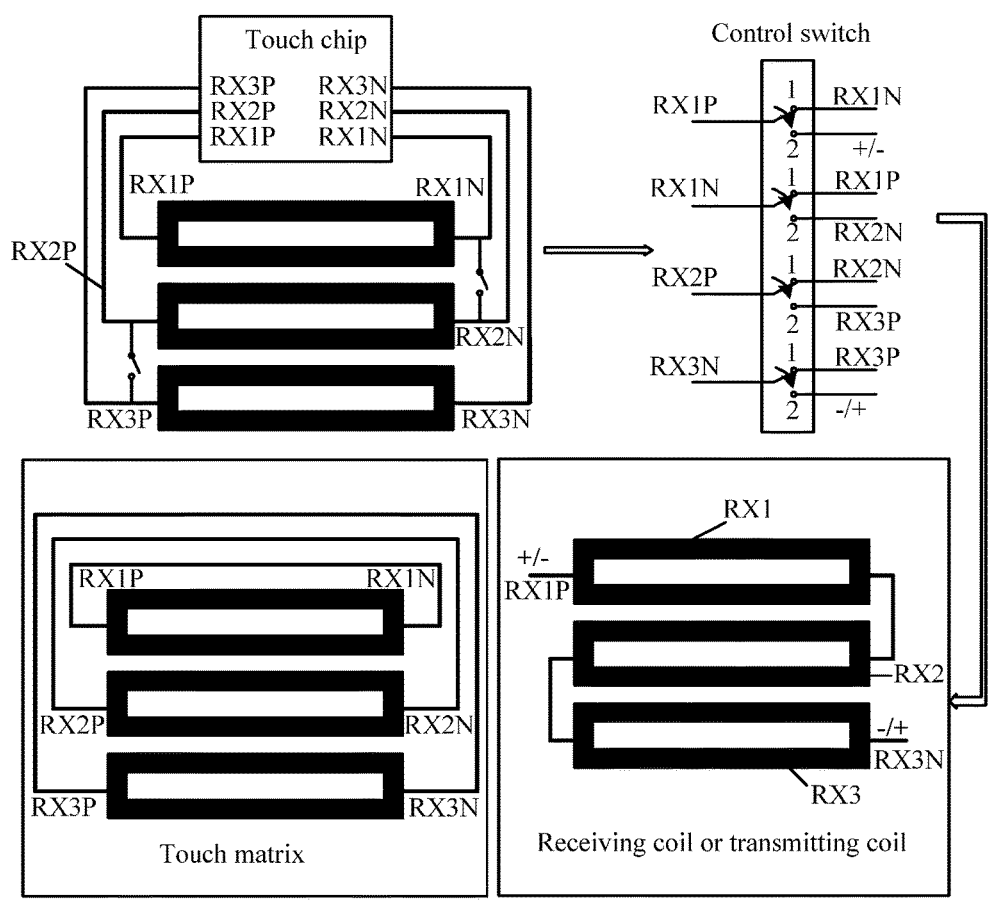
FIG. 4 is a schematic diagram illustrating connection between the touch sensor and the control switch according to an embodiment of the present disclosure.

On the basis of the embodiment illustrated in FIG. 3, the three sensing (RX) electrodes are taken as an example. FIG. 4 is a schematic diagram illustrating connection between the touch sensor and the control switch according to an embodiment. When a port "1" of the control switch on the upper right side of FIG. 4 is connected, the equivalent connection mode of the electrode RX1, the electrode RX2 and the electrode RX3 is as illustrated on the lower left side of FIG. 4. In this case, the electrode RX1, the electrode RX2 and the electrode RX3 form a touch matrix, and operate in a conventional touch control state, such that the touch screen has the touch function. When the port "2" of the control switch on the upper right side of FIG. 4 is connected, the equivalent connection mode of the electrode RX1, the electrode RX2 and the electrode RX3 is as illustrated on the lower right side of FIG. 4. In this case, the electrode RX1, the electrode RX2 and the electrode RX3 are connected end-to-end to form an S-shaped receiving coil or transmitting coil. Specifically, if the S-shaped coil is connected to a wireless transmitting circuit, the transmitting coil is formed, and the touch screen has a function of wireless power supply, and if the S-shaped coil connects to a wireless receiving circuit, the receiving coil is formed, and the touch screen has a function of wireless charging.

Figure 5:
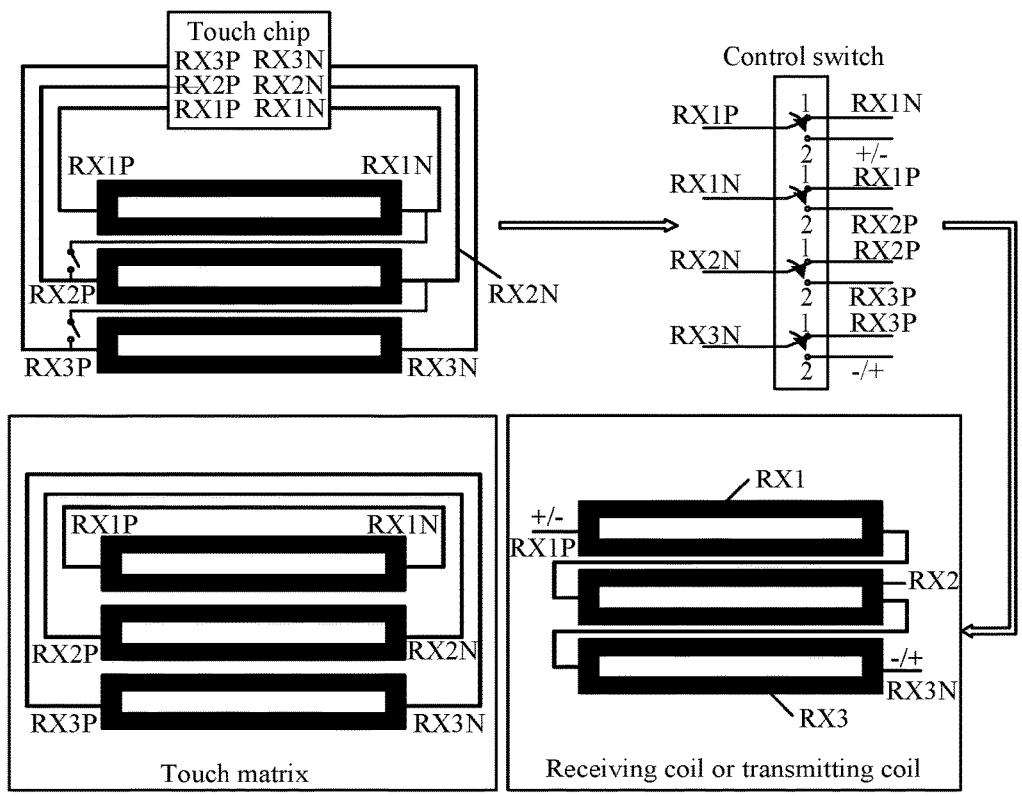
FIG. 5 is a schematic diagram illustrating connection between the touch sensor and the control switch according to another embodiment of the present disclosure.

On the basis of the embodiment illustrated in FIG. 3, the three sensing (RX) electrodes are still taken as an example. FIG. 5 is a schematic diagram illustrating connection between the touch sensor and the control switch according to another embodiment. When a port "1" of the control switch on the upper right side of FIG. 5 is connected, the equivalent connection mode of the electrode RX1, the electrode RX2 and the electrode RX3 is as illustrated on the lower left side of FIG. 5. In this case, the electrode RX1, the electrode RX2 and the electrode RX3 form a touch matrix, and operate in the conventional touch control state, such that the touch screen has the touch function. When a port "2" of the control switch on the upper right side of FIG. 5 is connected, the equivalent connection mode of the electrode RX1, the electrode RX2 and the electrode RX3 is illustrated on the lower right side of FIG. 5. In this case, the electrode RX1, the electrode RX2 and the electrode RX3 are connected end-to-end to form an S-shaped receiving coil or transmitting coil, such that the touch screen has the function of wireless power supply or wireless charging correspondingly.

Figure 6:
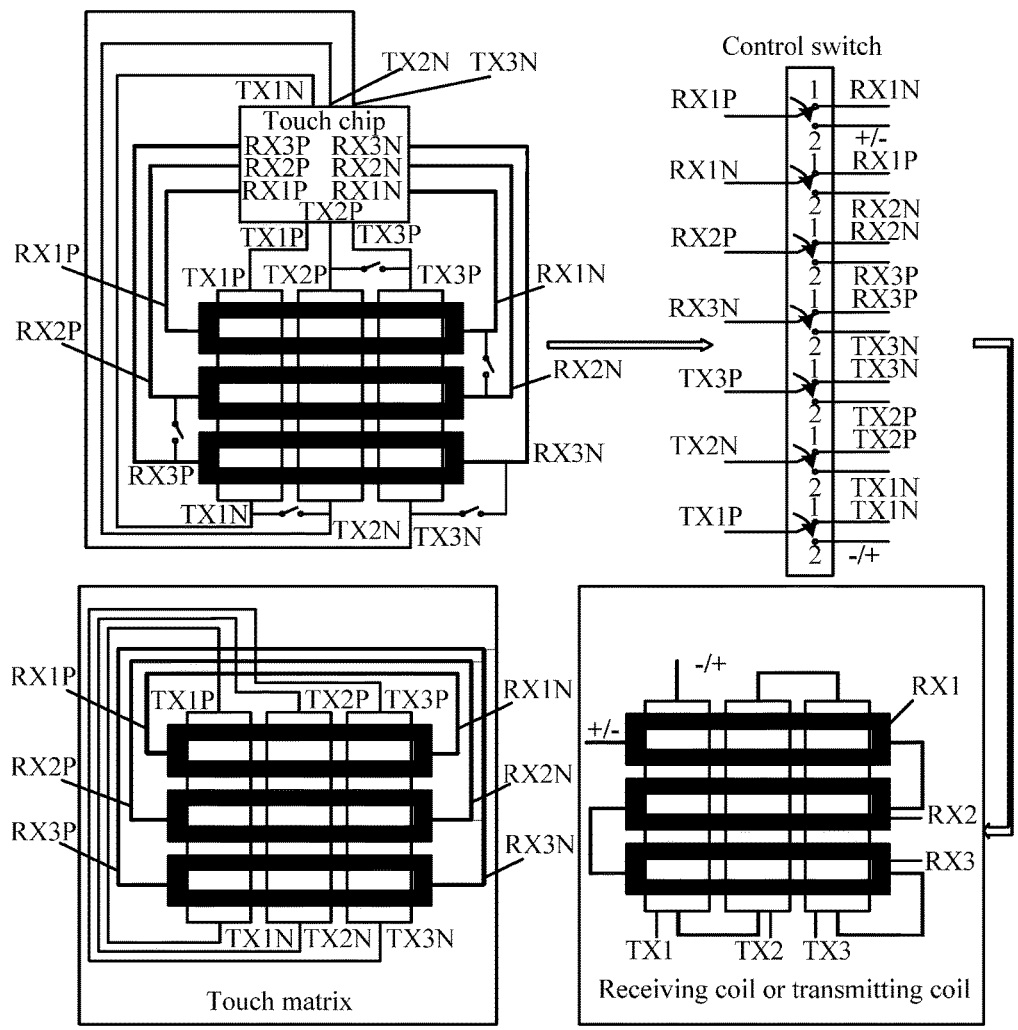
FIG. 6 is a schematic diagram illustrating connection between the touch sensor and the control switch according to another embodiment of the present disclosure.

A case where three sensing (RX) electrodes and three driving (TX) electrodes are provided is taken as an example, as illustrated in FIG. 6, which is a schematic diagram illustrating connection between the touch sensor and the control switch according to another embodiment. The control switch is arranged on the touch sensor. Three pins RX1N, RX2N and RX3N are respectively arranged on the right ends of the three RX electrodes, and three pins RX1P, RX2P and RX3P are respectively arranged on the left ends of the three RX electrodes. A conductive wire RX1P extended from the left end of the electrode RX1 is connected to a RX1P terminal of the touch chip, and a conductive wire RX1N extended from the right end of the electrode RX1 is connected to a RX1N terminal of the touch chip. A conductive wire RX2P extended from the left end of the electrode RX2 is connected to a RX2P terminal of the touch chip, and a conductive wire RX2N extended from the right end of the electrode RX2 is connected to a RX2N terminal of the touch chip. A conductive wire RX3P extended from the left end of the electrode RX3 is connected to a RX3P terminal of the touch chip, and a conductive wire RX3N extended from the right end of the electrode RX3 is connected to a RX3N terminal of the touch chip. Three pins TX1N, TX2N, and TX3N are respectively arranged on the upper ends of the three TX electrodes, and three pins TX1P, TX2P, and TX3P are respectively arranged on the lower ends of the three TX electrodes. A conductive wire TX1P extended from the upper end of the electrode TX1 is connected to a TX1P terminal of the touch chip, and a conductive wire TX1N extended from the lower end of the electrode TX1 is connected to a TX1N terminal of the touch chip. A conductive wire TX2P extended from the upper end of the electrode TX2 is connected to a TX2P terminal of the touch chip, and a conductive wire TX2N extended from the lower end of the electrode TX2 is connected to a TX2N terminal of the touch chip. A conductive wire TX3P extended from the upper end of the electrode TX3 is connected to a TX3P terminal of the touch chip, and a conductive wire TX3N extended from the lower end of the electrode TX3 is connected to a TX3N terminal of the touch chip. When a port "1" of the control switch on the upper right side of FIG. 6 is connected, the equivalent connection mode of the driving electrodes TX1, TX2, TX3 and the sensing electrodes RX1, RX2 and RX3 is illustrated on the lower left side of FIG. 6. In this case, the electrode TX1, the electrode TX2, the electrode TX3, the electrode RX1, the electrode RX2, and the electrode RX3 form a touch matrix, and operate in the conventional touch control state, such that the touch screen has the touch function. When a port "2" of the control switch on the upper right side of FIG. 6 is connected, the equivalent connection mode of the electrode TX1, the electrode TX2, the electrode TX3, the electrode RX1, the electrode RX2, and the electrode RX3 is illustrated on the lower right side of FIG. 6. In this case, the electrode RX1, the electrode RX2 and the electrode RX3 are connected end-to-end to form an S-shaped receiving coil or transmitting coil, and the electrode TX1, the electrode TX2 and the electrode TX3 are connected end-to-end to form an S-shaped receiving coil or transmitting coil which is perpendicular to the coil formed by the electrode RX1, electrode RX2 and electrode RX3, such that the touch screen has the function of wireless power supply or wireless charging.

Compared with FIG. 4 and FIG. 5, in FIG. 6, a coil is formed by the RX electrodes connected end-to-end, and another coil is formed by the TX electrodes connected end-to-end. The coil formed by the RX electrodes is connected in series with the coil formed by the TX electrodes to form a bigger receiving coil or transmitting coil, such that a greater charging current can be provided.

In specific application scenarios, the structure of the touch screen includes but is not limited to Glass-Film-Film (which is abbreviated as GFF), Glass-Film Multi-point (which is abbreviated as GFM), One Glass Solution (which is abbreviated as OGS), ON-CELL, IN-CELL or Glass-Film (which is abbreviated as GF). The process of wireless charging of the touch screen is described in combination with specific embodiments in the following.

Figure 7:
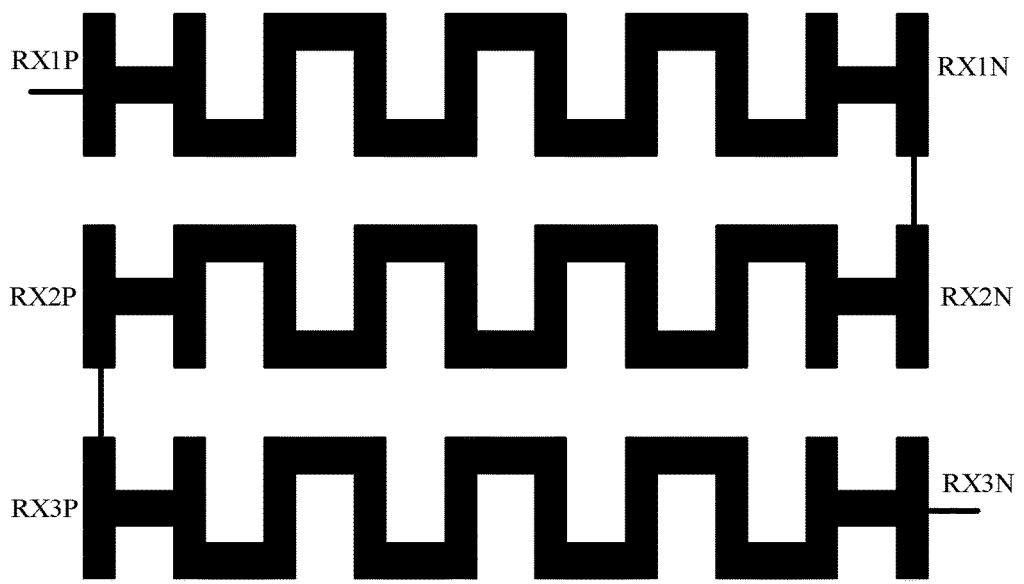
FIG. 7 is a schematic structural diagram of a touch sensor according to an embodiment of the present disclosure.

FIG. 7 is a schematic structural diagram of a touch sensor in a touch screen according to an embodiment. The electrode RX1, the electrode RX2 and the electrode RX3 of the touch sensor are designed to have an S shape in the transverse direction, and are connected end-to-end to form a bigger receiving coil or transmitting coil. That is, a terminal RX1N of the electrode RX1 is connected to a terminal RX2N of the electrode RX2, a terminal RX2P of the electrode RX2 is connected to a terminal RX3P of the electrode RX3, such that a bigger S-shaped receiving coil or transmitting coil is formed for wireless charging.

Figure 8:
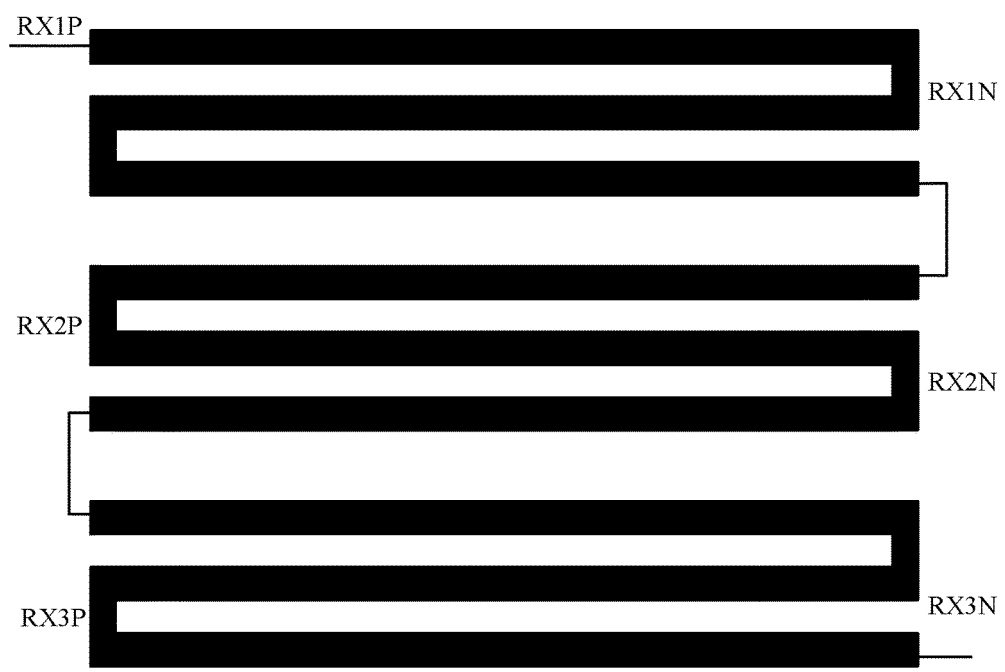
FIG. 8 is a schematic structural diagram of a touch sensor according to another embodiment of the present disclosure.

FIG. 8 is a schematic structural diagram of a touch sensor in a touch screen according to another embodiment. The electrode RX1, the electrode RX2 and the electrode RX3 of the touch sensor are designed to have an S shape in the longitudinal direction, and are connected end-to-end to form a bigger receiving coil or transmitting coil. That is, a terminal RX1N of the electrode RX1 is connected to a terminal RX2N of the electrode RX2, a terminal RX2P of the electrode RX2 is connected to a terminal RX3P of the electrode RX3, such that a bigger S-shaped receiving coil or transmitting coil is formed for wireless charging.

Figure 9:
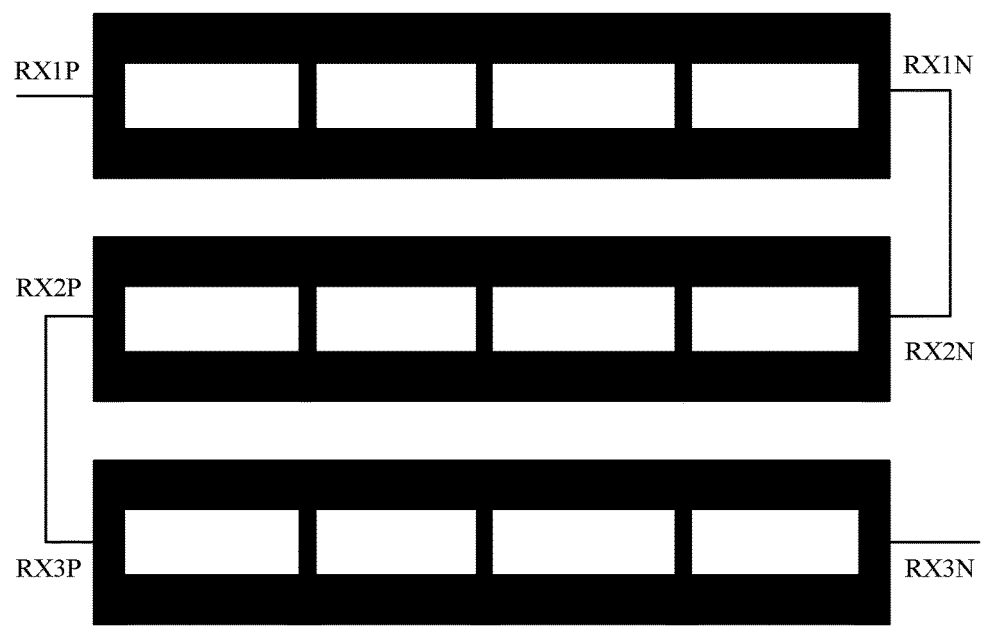
FIG. 9 is a schematic structural diagram of a touch sensor according to another embodiment of the present disclosure.

FIG. 9 is a schematic structural diagram of a touch sensor in a touch screen according to another embodiment. The electrode RX1, the electrode RX2 and the electrode RX3 are designed to have a hollowed frame structure, and are connected end-to-end to form a bigger receiving coil or transmitting coil. That is, a terminal RX1N of the electrode RX1 is connected to a terminal RX2N of the electrode RX2, a terminal RX2P of the electrode RX2 is connected to a terminal RX3P of the electrode RX3, such that a bigger S-shaped receiving coil or transmitting coil is formed for wireless charging.

Figure 10:
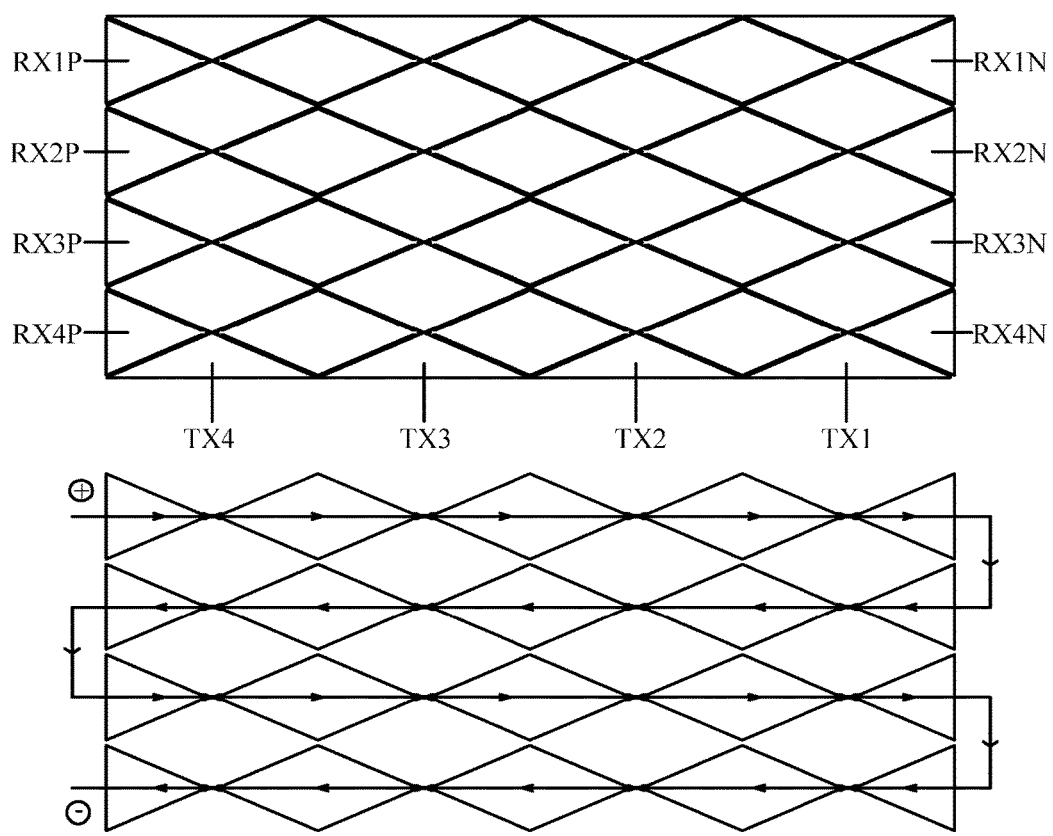
FIG. 10 is a schematic structural diagram of a touch sensor according to another embodiment of the present disclosure.

FIG. 10 is a schematic structural diagram of a touch sensor in a touch screen according to another embodiment. The electrode RX1, the electrode RX2, the electrode RX3, the electrode RX4, the electrode TX1, the electrode TX2, the electrode TX3, and the electrode TX4 of the touch sensor are designed to form a bridged structure. The electrodes RX1, RX2, RX3 and RX4 in the X direction and the electrodes TX1, TX2, TX3, TX4 in the Y direction are formed on the same insulating material layer. The electrodes in any one of the X direction and the Y direction are bridged to form a rhombus array of m rows (m>1) or n columns (n>1) on the entire screen. When the touch screen is in the wireless charging state, the rhombic electrodes are connected end-to-end from left to right to form the receiving coil or the transmitting coil for wireless charging.

Figure 11:
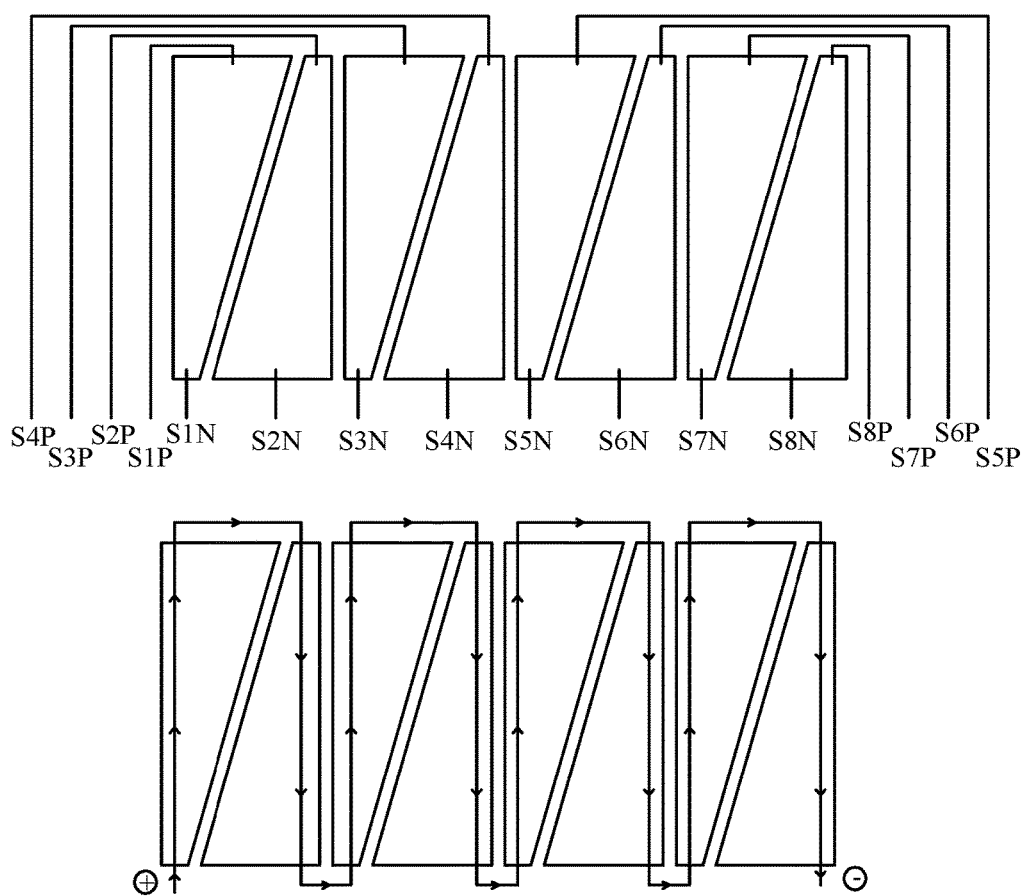
FIG. 11 is a schematic structural diagram of a touch sensor according to another embodiment of the present disclosure.

As illustrated in FIG. 11, which is a schematic structural diagram of a touch sensor in a touch screen according to another embodiment, each of the electrodes S1 to S8 of the touch screen is designed to have a single-layer triangular structure. Paired triangular electrodes are formed on the same insulating material layer. N (N>1) pairs of triangular electrodes are formed on the entire screen. When the touch screen operates in the touch control state, the electrodes S1 to S8 act as both sensing electrodes and driving electrodes for detecting self-capacitance. When the touch screen operates in the wireless charging state, the triangular electrodes are connected end-to-end from left to right to form a receiving coil or transmitting coil for wireless charging.

Figure 12:
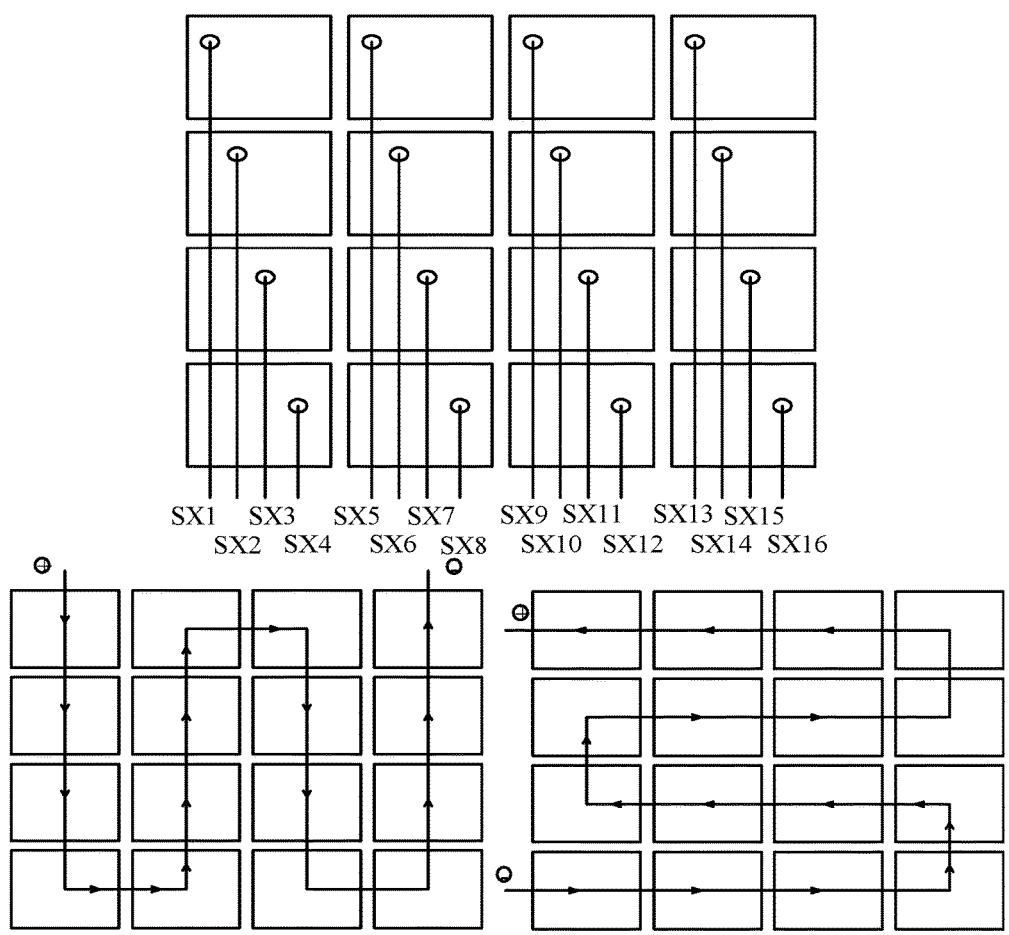
FIG. 12 is a schematic structural diagram of a touch sensor according to another embodiment of the present disclosure.

As illustrated in FIG. 12, which is a schematic structural diagram of a touch sensor in a touch screen according to another embodiment, the electrodes SX1 to SX16 of the touch sensor are designed to have an arrayed self-capacitive rectangular structure. The rectangular structure is divided into n (n>1) smaller pieces to form electrodes in an X direction and in a Y direction. When the touch screen operates in the touch control state, the electrodes SX1 to SX16 act as both sensing electrodes and driving electrodes for detecting self-capacitance. When the touch screen operates in the wireless charging state, the triangular electrodes are connected end-to-end from left to right to form a receiving coil or transmitting coil for wireless charging.

Figure 13:
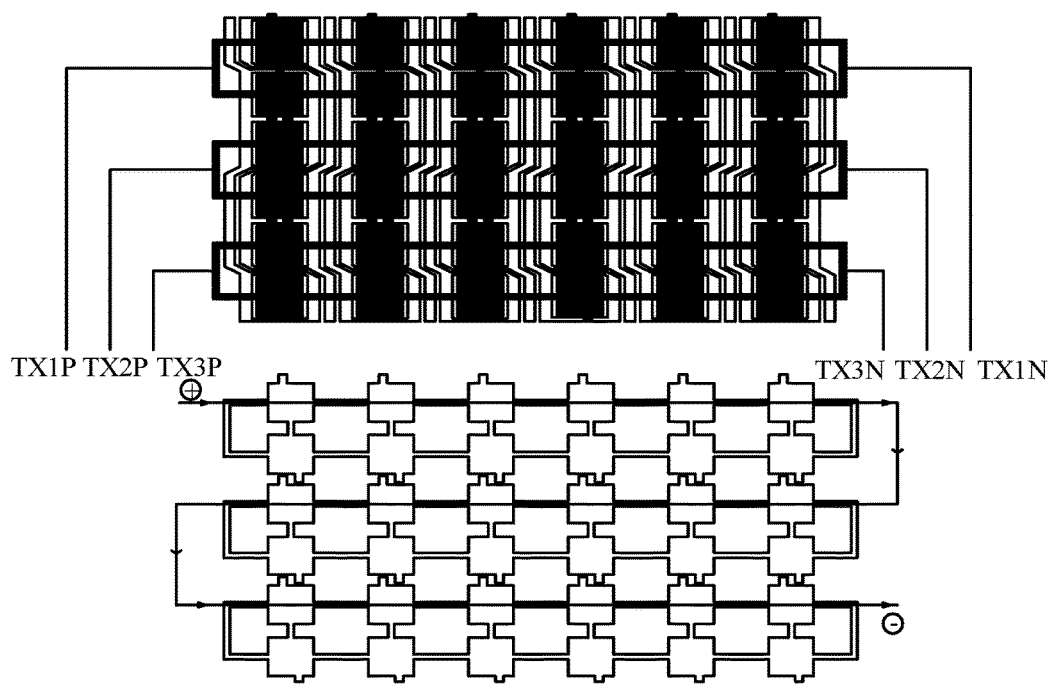
FIG. 13 is a schematic structural diagram of a touch sensor according to another embodiment of the present disclosure.

As illustrated in FIG. 13, which is a schematic structural diagram of the touch sensor in a touch screen according to another embodiment, each of the electrode TX1, the electrode TX2 and the electrode TX3 of the touch sensor is designed to have a double-layer 1T2R pattern structure. Similar to the conventional GFF structure, the 1T2R pattern structure reduces the number of traces on the frame, and the touch sensor can be controlled by the touch chip to form the touch matrix. When the touch screen operates in the wireless charging state, the electrodes are first connected end-to-end from left to right, and then connected line by line from top to bottom, to form the receiving coil or transmitting coil for wireless charging.

Figure 14:
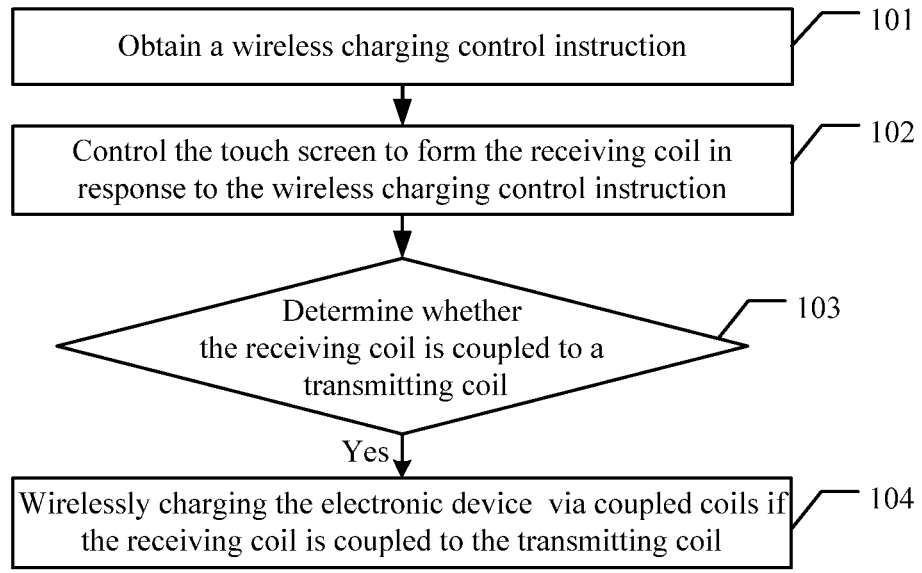
FIG. 14 is a schematic diagram of a wireless charging method according to an embodiment of the present disclosure.

The specific structures of the touch screen are described above in detail. Reference is made to FIG. 14, which is a schematic diagram of a wireless charging method according to an embodiment of the present disclosure. The wireless charging method is applied to an electronic device, which includes the touch screen described in any one of the embodiments illustrated in FIGS. 1 to 13. The wireless charging method includes the following steps 101 to 104.

In step 101, a wireless charging control instruction is obtained.

The electronic device obtains the wireless charging control instruction. The wireless charging control instruction may be control information issued in response to the user's touch on the touch screen, or may be gesture information, voice information, graphic information or text information obtained by other ways, which is not limited herein.

In step 102, the touch screen is controlled to form the receiving coil in response to the wireless charging control instruction.

If the wireless charging control instruction instructs the touch screen to operate as the wireless charging receiving device, the electronic device controls the touch screen to form the receiving coil in response to the wireless charging control instruction.

In step 103, it is determined whether the receiving coil is coupled to a transmitting coil. The method proceeds to step 104 if it is determined that the receiving coil is coupled to a transmitting coil, and the procedure is ended if it is determined that the receiving coil is not coupled to a transmitting coil.

In step 104, if the receiving coil is coupled to the transmitting coil, the electronic device is wirelessly charged via coupled coils.

In some possible implementations, the electronic device further includes a display screen. After controlling the touch screen to form the receiving coil in response to the wireless charging control instruction, the display screen is controlled to display a black screen. In this way, power is saved, and the privacy of personal information can be protected.

In some possible implementations, after controlling the touch screen to form the transmitting coil in response to the wireless charging control instruction, the wireless charging method further includes controlling the display screen to display a bright screen and disabling the touch function of the touch screen. In this way, although the touch screen is used for performing the charge function, and the touch function is disabled, by keeping the screen bright, the user can still obtain relevant display information from the display screen, such that charging and displaying can be performed simultaneously.

In some possible implementations, the touch screen is placed to face the transmitting coil. In this way, the transmitting coil covers the surface of the touch screen when the touch screen is placed to face the transmitting coil, such that the privacy of personal information can be protected. Of course, in practice, the touch screen may be placed to face the transmitting coil at a certain angle relative to the transmitting coil, or may be place in other ways, which is not limited herein.

Figure 15:
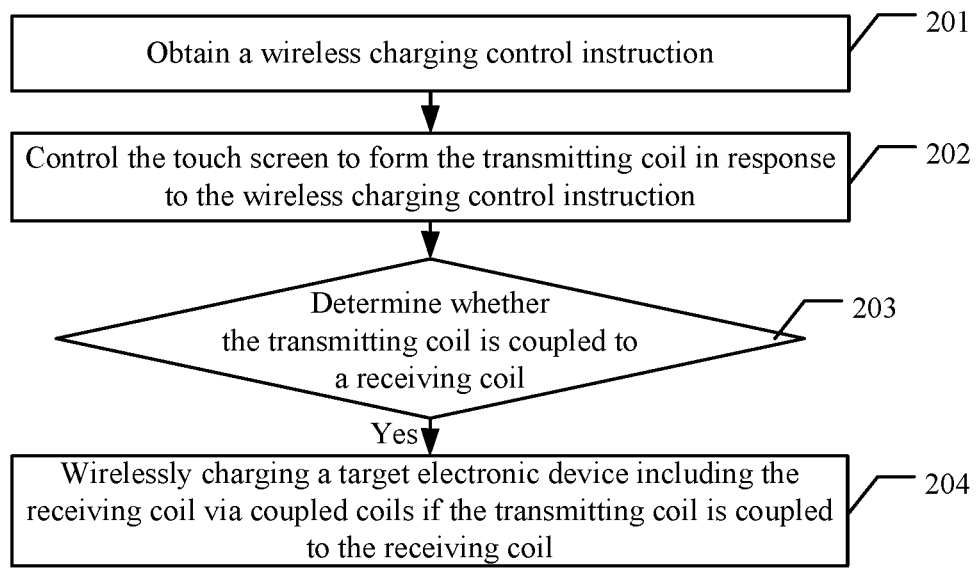
FIG. 15 is a schematic diagram of a wireless charging method according to another embodiment of the present disclosure.

FIG. 15 is schematic diagram of a wireless charging method according to another embodiment of the present disclosure. The wireless charging method is applied to an electronic device, which includes the touch screen described in any one of the embodiments illustrated in FIGS. 1 to 13. The wireless charging method includes the following steps 201 to 204.

In step 201, a wireless charging control instruction is obtained.

In step 202, the touch screen is controlled to form the transmitting coil in response to the wireless charging control instruction.

In step 203, it is determined whether the transmitting coil is coupled to a receiving coil. The method proceeds to step 204 if it is determined that the transmitting coil is coupled to a receiving coil, and the procedure is ended if it is determined that the transmitting coil is not coupled to a receiving coil.

In step 204, if the transmitting coil is coupled to the receiving coil, a target electronic device including the receiving coil is wirelessly charged via coupled coils.

In some possible implementations, the electronic device further includes a display screen. After controlling the touch screen to form the transmitting coil in response to the wireless charging control instruction, the method further includes controlling the display screen to display a black screen.

In some possible implementations, after controlling the touch screen to form the transmitting coil in response to the wireless charging control instruction, the method further includes controlling the display screen to display a bright screen and disabling the touch function of the touch screen. In this way, although the touch screen is used for performing the charge function, and the touch function is disabled, by keeping the screen bright, the user can still obtain relevant display information from the display screen, such that charging and displaying can be performed simultaneously.

In some possible implementations, the touch screen is placed to face the receiving coil.

There are the same or similar contents between the embodiment illustrated in FIG. 15 and the embodiment illustrated in FIG. 14. Therefore, one can refer to the description of the embodiment illustrated in FIG. 14 for detailed description of the embodiment illustrated in FIG. 15, which is not repeated herein.

Figure 16:
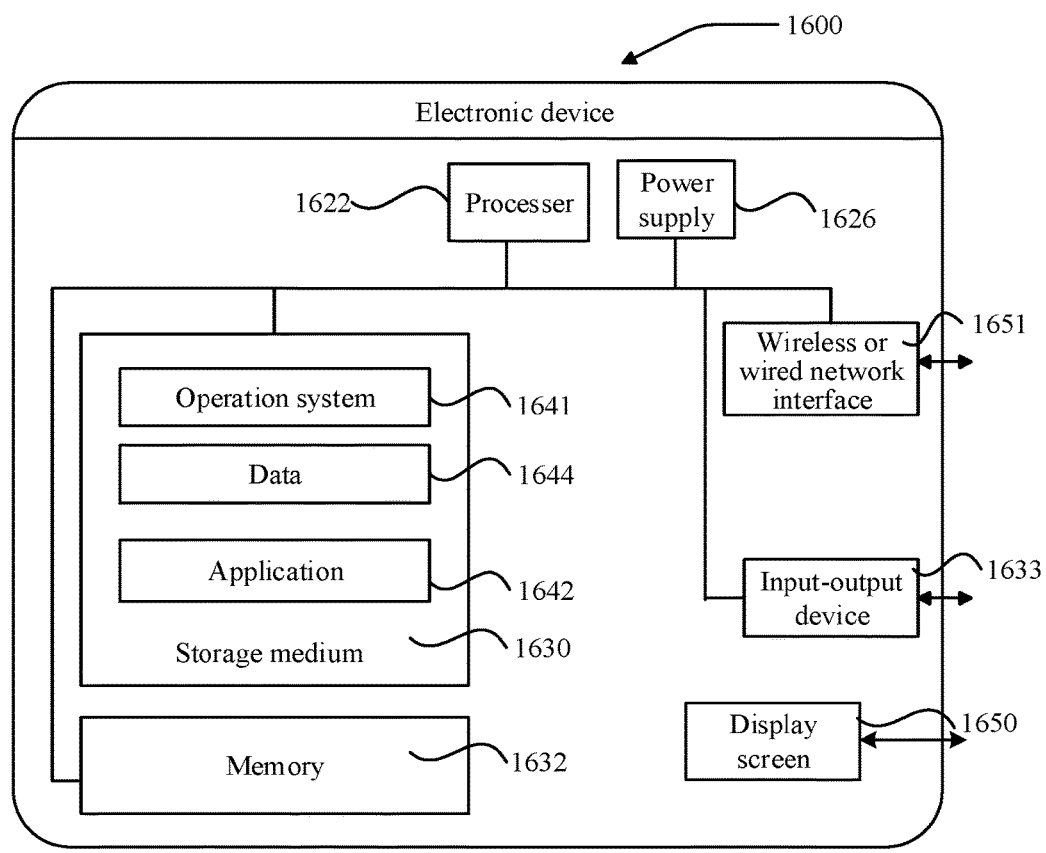
FIG. 16 is a schematic structural diagram of an electronic device according to an embodiment of the present disclosure.

FIG. 16 is a schematic structural diagram of an electronic device according to an embodiment of the present disclosure. The electronic device 1600 can vary greatly depending on configurations or performances. The electronic device 1600 may include one or more processors 1622, one or more memories 1632 and an input-output device 1633. The input-output device 1633 includes the touch screen described in any one of the embodiments illustrated in FIGS. 1 to 13. The electronic device 1600 may also include one or more storage mediums 1630 that store applications 1642 or data 1644 (such as one or more mass storage devices). The memory 1632 and storage mediums 1630 may be transient or persistent storage devices. The applications stored in the storage mediums 1630 may include one or more modules (which are not illustrated in FIG. 16), each module may include a series of instructions for instructing operations of the electronic device. Furthermore, the one or more processors 1622 may be configured to communicate with the one or more storage mediums 1630, and execute the series of instructions in the storage mediums 1630.

The electronic device 1600 may also include a display screen 1650, one or more power supplies 1626, one or more wireless or wired network interfaces 1651, and/or one or more operating systems 1641.

The steps performed by the electronic device in the above embodiments can be implemented based on the structure of the electronic device illustrated in FIG. 16.

The one or more processors 1622 can make the electronic device to execute the steps actually executed by the electronic device in the embodiments illustrated in FIG. 14 and FIG. 15.

A computer storage media is provided according to an embodiment of the present disclosure. The computer storage media is configured to store computer software instructions used by the above electronic device. The computer software instructions include programs designed for the methods that are actually performed by the electronic device in the embodiments illustrated in FIG. 14 and FIG. 15.

Figure 17:
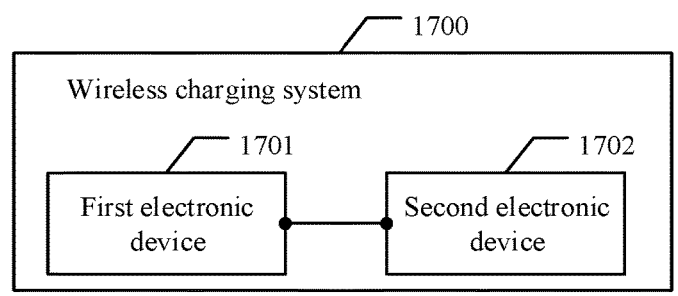
FIG. 17 is a schematic structural diagram of a wireless charging system according to an embodiment of the present disclosure.

A wireless charging system is further provided according to an embodiment of the present disclosure. As illustrated in FIG. 17, the wireless charging system 1700 includes a first electronic device 1701 and a second electronic device 1702. The first electronic device includes the touch screen according to any one of the embodiments illustrated in FIGS. 1 to 13. One can refer to the description of the touch screen according to the embodiments illustrated in FIGS. 1 to 13 for detailed description of the touch screen, which is not repeated herein. The second electronic device 1702 includes a transmitting coil, which is configured to be coupled to the receiving coil formed by the touch screen of the first electronic device 1701 to wirelessly charge the first electronic device 1701. Specifically, the second electronic device 1702 can be a wireless charging base or other electronic device which has the wireless charging transmitting function.

Continuing to refer to FIG. 17, in another implementation of the wireless charging system, the touch screen of the first electronic device 1701 forms the transmitting coil, the second electronic device 1702 includes a receiving coil. The transmitting coil formed by the touch screen of the first electronic device 1701 is coupled to the receiving coil of the second electronic device 1702 to wirelessly charge the second electronic device. Specifically, the second electronic device can be any device which is capable of being wirelessly charged by using an external charging coil.

In practice, each of the first electronic device and the second electronic device can be a terminal with the communication function. The first electronic device sends a wireless charging request message to the second electronic device, such that the second electronic device forms the transmitting coil in response to the wireless charging request message. The first electronic device receives a wireless charging confirmation message sent by the second electronic device, and controls the touch screen to form the receiving coil in response to the wireless charging confirmation message. The receiving coil is configured to be coupled to the transmitting coil to perform wireless charging.

In practice, the first electronic device can also receive the wireless charging request message sent by the second electronic device, and control the touch screen to form the transmitting coil in response to the wireless charging request message. The first electronic device sends the wireless charging confirmation message to the second electronic device, such that the second electronic device forms the receiving coil in response to the wireless charging confirmation message. The transmitting coil is configured to be coupled to the receiving coil to perform wireless charging.

In a specific application, a case where a wireless charging transmitter is a charging base is taken as an example. When the touch screen of the first electronic device is placed to face the charging base, the first electronic device automatically searches for a charging signal and decides whether to switch to the wireless charging state, or decides whether to switch to the wireless charging state based on the user's operation. Of course, when the first electronic device is in a standby state, a sleep state or another idle state, the first electronic device can also automatically search for the charging signal. If there is a charging signal, the first electronic device can automatically switch to the wireless charging state, which is not limited herein.

It may be clearly understood by those skilled in the art that, for ease of describing and for simplicity, one can refer to corresponding processes in the above method embodiment for an operating process of the system, the apparatus and the unit described above, which is not repeated herein.

In the embodiments according to the present disclosure, it should be understood that the disclosed system and device may be implemented in other ways. For example, the device embodiments described above are only schematic. For example, the units are divided based on a logic function thereof, and they may be divided in another way in practice. For example, multiple units or modules may be combined or integrated into another system, or some features may be omitted or not performed. In addition, a coupling, a direct coupling or a communication connection between displayed or discussed constitutional components may be an indirect coupling or a communication connection via some interfaces, devices or modules, and may be in an electrical form, a mechanical form or another form.

A unit described as a separate component may be or may not be separated in physical, a component displayed as a unit may be or may not be a physical unit, that is, may be placed in a same position or may be distributed in multiple network units. A part of or all modules may be selected if desired to realize the object of the embodiments.

In addition, each function unit according to each embodiment of the present application may be integrated into one processing unit, or may be a separate unit physically, or two or more units are integrated into one unit. The integrated unit described above may be realized in a hardware way, or may be realized by a software function unit.

The integrated unit may be stored in a computer readable storage medium if the integrated unit is implemented in a software function unit and sold or used as a separate product. Base on such understanding, the essential part of the technical solution of the present application or the part of the technical solution of the present application contributed to the conventional technology or all of or a part of the technical solution may be embodied in a software product way. The computer software product is stored in a storage medium, which includes several instructions to make a computer device (may be a personal computer, a server, a network device or the like) execute all or a part of steps of the method according to each embodiment of the present application. The storage medium described above includes various mediums which can store program codes such as a USB disk, a mobile hard disk, a read-only memory (abbreviated as "ROM"), a random access memory (abbreviated as "RAM"), a disk and a compact disc.

Finally, it should be noted that, the above embodiments are merely provided for describing the technical solutions of the present application, but are not intended to limit the present application. Although the present application is described in detail with reference to the foregoing embodiments, those skilled in the art should understand that, they can still modify technical solutions described in the foregoing embodiments, or make equivalent substitutions to a part or all of the technical features; and such modifications or substitutions do not enable the essence of corresponding technical solutions to depart from the scope of the embodiments of the present application.

The invention claimed is:

1. A touch screen applied to an electronic device, comprising:
   a touch sensor; and
   a touch chip electrically connected to the touch sensor, and configured to control the touch sensor to form a receiving coil or a transmitting coil if the touch screen is used for wireless charging, wherein
   in a case that the touch sensor comprises first conducting electrodes and second conducting electrodes, the first conducting electrodes and the second conducting electrodes are arranged across each other at a predetermined angle, and the predetermined angle is an acute angle or a right angle,
      the touch chip being configured to control the touch sensor to form the receiving coil comprises the touch chip being configured to control the first conducting electrodes to form a first receiving coil, and/or control the second conducting electrodes to form a second receiving coil, and
      the touch chip being configured to control the touch sensor to form the transmitting coil comprises the touch chip being configured to control the first conducting electrodes to form a first transmitting coil, and/or control the second conducting electrodes to form a second transmitting coil, and
   in a case that the touch sensor comprises self-capacitive conducting electrodes,
      the touch chip being configured to control the touch sensor to form the receiving coil comprises the touch chip being configured to control the self-capacitive conducting electrodes to form a receiving coil, and
      the touch chip being configured to control the touch sensor to form the transmitting coil comprises the touch chip being configured to control the self-capacitive conducting electrodes to form a transmitting coil.

2. The touch screen according to claim 1, wherein the touch chip controls the touch sensor to form a touch matrix if the touch screen is used for touch control.

3. The touch screen according to claim 1, further comprising:
   a control switch arranged on the touch sensor or the touch chip, or arranged individually, wherein
   the touch chip controls the touch sensor to form the receiving coil or the transmitting coil via the control switch if the touch screen is used for wireless charging; and
   the touch chip controls the touch sensor to form the touch matrix via the control switch if the touch screen is used for touch control.

4. The touch screen according to claim 3, wherein the control switch comprises a first port and a second port, wherein
   the touch sensor forms the touch matrix if the first port is electrically connected to the touch sensor; and
   the touch sensor forms the receiving coil or the transmitting coil if the second port is electrically connected to the touch sensor.

5. The touch screen according to claim 1, wherein
   the first conducting electrodes and the second conducting electrodes are arranged on a same surface of a same insulating material layer, wherein the first conducting electrodes and the second conducting electrodes are arranged across each other at the predetermined angle on a same plane; and
   the first conducting electrodes and the second conducting electrodes form capacitive nodes, the number of the first conducting electrodes is m, the number of the second conducting electrodes is n, and the first conducting electrodes and the second conducting electrodes form an array of m times n, wherein each of m and n is an integer greater than 1.

6. The touch screen according to claim 1, wherein
the first conducting electrodes and the second conducting electrodes are respectively arranged on top surfaces of two insulating material layers or bottom surfaces of two insulating material layers, wherein the first conducting electrodes and the second conducting electrodes are arranged across each other at the predetermined angle on different planes; and
the first conducting electrodes and the second conducting electrodes form capacitive nodes, the number of the first conducting electrodes is m, the number of the second conducting electrodes is n, and the first conducting electrodes and the second conducting electrodes form an array of m times n, wherein each of m and n is an integer greater than 1.

7. The touch screen according to claim 1, wherein
the first conducting electrodes and the second conducting electrodes are respectively arranged on two surfaces of a same insulating material layer, wherein the first conducting electrodes and the second conducting electrodes are arranged across each other at the predetermined angle on different planes; and
the first conducting electrodes and the second conducting electrodes form capacitive nodes, the number of the first conducting electrodes is m, the number of the second conducting electrodes is n, and the first conducting electrodes and the second conducting electrodes form an array of m times n, wherein each of m and n is an integer greater than 1.

8. A wireless charging method applied to an electronic device, wherein the electronic device comprises the touch screen according to claim 1, and the wireless charging method comprises:
obtaining a wireless charging control instruction;
controlling the touch screen to form the receiving coil in response to the wireless charging control instruction; and
wirelessly charging the electronic device via coupled coils if the receiving coil is coupled to a transmitting coil.

9. The wireless charging method according to claim 8, wherein the electronic device further comprises a display screen, and after the controlling the touch screen to form the receiving coil in response to the wireless charging control instruction, the wireless charging method further comprises:
controlling the display screen to display a black screen; or
controlling the display screen to display a bright screen and disabling a touch function of the touch screen.

10. The wireless charging method according to claim 8, further comprising: placing the touch screen to face the transmitting coil.

11. A wireless charging method applied to an electronic device, wherein the electronic device comprises the touch screen according to claim 1, and the wireless charging method comprises:
obtaining a wireless charging control instruction;
controlling the touch screen to form the transmitting coil in response to the wireless charging control instruction; and
wirelessly charging a target electronic device including a receiving coil via coupled coils if the transmitting coil is coupled to the receiving coil.

12. The wireless charging method according to claim 11, wherein the electronic device further comprises a display screen, and after the controlling the touch screen to form the transmitting coil in response to the wireless charging control instruction, the wireless charging method further comprises:
controlling the display screen to display a black screen; or
controlling the display screen to display a bright screen and disabling a touch function of the touch screen.

13. The wireless charging method according to claim 11, further comprising: placing the touch screen to face the receiving coil.

14. An electronic device applied to wireless charging, wherein the electronic device comprises:
an input-output device, comprising the touch screen according to claim 1, and configured to obtain the wireless charging control instruction;
a memory configured to store computer executable program codes, wherein the computer executable program codes comprises program instructions; and
a processor configured to execute the program instructions stored in the memory in response to the wireless charging control instruction, wherein when the program instructions are executed, the touch screen is controlled to form the receiving coil.

15. The electronic device according to claim 14, wherein the input-output device further comprises a display screen, wherein
when the program instructions are executed, the display screen displays a black screen; or
when the program instructions are executed, the display screen displays a bright screen and a touch function of the touch screen is disabled.

16. An electronic device applied to wireless charging, comprising:
an input-output device, comprising the touch screen according to claim 1, and configured to obtain the wireless charging control instruction;
a memory configured to store computer executable program codes, wherein the computer executable program codes comprises program instructions; and
a processor configured to execute the program instructions stored in the memory in response to the wireless charging control instruction, wherein when the program instructions are executed, the touch screen is controlled to form the transmitting coil.

17. The electronic device according to claim 16, wherein the input-output device further comprises a display screen, wherein,
when the program instructions are executed, the display screen displays a black screen; or
when the program instructions are executed, the display screen displays a bright screen and a touch function of the touch screen is disabled.

18. A wireless charging system, comprising a first electronic device and a second electronic device, wherein
the first electronic device is the electronic device according to claim 14, wherein the first electronic device comprises the receiving coil;
the second electronic device comprises a transmitting coil; and
the transmitting coil is configured to be coupled to the receiving coil to wirelessly charge the first electronic device.

19. A wireless charging system, comprising a first electronic device and a second electronic device, wherein
the first electronic device is the electronic device according to claim 16, wherein the first electronic device comprises the transmitting coil;
the second electronic device comprises a receiving coil; and the receiving coil is configured to be coupled to the transmitting coil to wirelessly charge the second electronic device.

20. The touch screen according to claim 1, wherein the touch chip is configured to control the first receiving coil to be electrically connected to the second receiving coil to form a larger receiving coil, or to control the first transmitting coil to be electrically connected to the second transmitting coil to form a larger transmitting coil, if the touch screen is used for wireless charging.

* * * * *